(12) United States Patent
White et al.

(10) Patent No.: US 7,701,358 B1
(45) Date of Patent: Apr. 20, 2010

(54) VEHICLE CHILDSEAT THERMAL SAFETY ALARM SYSTEM

(76) Inventors: Donald Clyde White, 2945 Sterling St., Pomona, CA (US) 91767; Karen Marie White, 2945 Sterling St., Pomona, CA (US) 91767

( * ) Notice: Subject to any disclaimer, the term of this patent is extended or adjusted under 35 U.S.C. 154(b) by 511 days.

(21) Appl. No.: 11/379,894

(22) Filed: Apr. 24, 2006

Related U.S. Application Data

(60) Provisional application No. 60/674,467, filed on Apr. 25, 2005.

(51) Int. Cl.
*G08B 21/00* (2006.01)

(52) U.S. Cl. .................. 340/667; 340/665; 340/666; 340/457; 340/438; 340/425.5; 340/588; 340/870.17

(58) Field of Classification Search .......... 340/667, 340/665, 666, 457, 438, 439, 425.5, 584, 340/588, 573.1, 870.17; 180/272, 287; 701/44, 701/45

See application file for complete search history.

(56) References Cited

U.S. PATENT DOCUMENTS

| | | | |
|---|---|---|---|
| 5,793,291 A | 8/1998 | Thornton | |
| 5,949,340 A | 9/1999 | Rossi | |
| 5,966,070 A * | 10/1999 | Thornton | 340/425.5 |
| 6,028,509 A | 2/2000 | Rice | |
| 6,757,602 B2 | 6/2004 | Breed et al. | |
| 6,819,249 B1 | 11/2004 | Papp | |
| 6,922,622 B2 * | 7/2005 | Dulin et al. | 701/45 |
| 7,170,401 B1 * | 1/2007 | Cole | 340/457 |
| 2005/0068162 A1 * | 3/2005 | Santa Cruz et al. | 340/457 |
| 2005/0225440 A1 * | 10/2005 | Simmons et al. | 340/457 |

OTHER PUBLICATIONS

NASA Press Release, "NASA develops child car-seat safety device" dated Feb. 5, 2002, available at http://www.nasa.gov/centers/langley/news/releases/2002/02-008_prt.htm.

* cited by examiner

*Primary Examiner*—Hung T. Nguyen
(74) *Attorney, Agent, or Firm*—William Keyworth; Bill & Mary Lou Inc.

(57) ABSTRACT

A vehicle warning system uses a switch placed on a vehicle childseat to determine occupancy of the seat, and a temperature detector to determine if an unsafe temperature exists in the vehicle interior. The system alarms if both these conditions exist to warn of a hazard to a child. The system installation in the vehicle is simply to place the switch on the childseat connect it into the system and provide power to the system. The system also provides a reminder if the alarm is turned off.

14 Claims, 3 Drawing Sheets

VEHICLE CHILDSEAT THERMAL SAFETY ALARM SYSTEM

CROSS-REFERENCE TO RELATED APPLICATIONS

This application claims the benefit of priority from Provisional Patent Application No. 60/674,467, "Vehicle Childseat Thermal Safety Alarm System" filed Apr. 25, 2005, which is incorporated herein by reference in its entirety.

STATEMENT REGARDING FEDERALLY SPONSORED RESEARCH AND DEVELOPMENT

Not Applicable.

REFERENCE TO A MICROFICHE APPENDIX

Not Applicable.

BACKGROUND OF THE INVENTION

1. Field of the Invention

This invention relates to a system and method of providing a warning of a child in a vehicle childseat when conditions in the vehicle are unsafe. This application uses the term childseat to refer to any seating provided in a vehicle to accommodate a child.

2. Description of Related Art

Children's bodies have greater surface area to body mass ratio than adults, so they absorb more heat on a hot day. Children also have lower perspiration capacity than adults, so they are less able to dissipate body heat. The result is tragic losses of children's lives have occurred due to the child being restrained in a vehicle childseat when the vehicle is parked and overheats inside. The American Academy of Pediatrics warns on their website (http://www.aap.org/family/carseat-guide.htm) not to leave a child unattended in a car safety seat as temperatures can reach deadly levels in minutes, and the child can die of heat stroke.

Alarm systems to protect children from this unsafe condition are known in the art. U.S. Pat. No. 5,793,291 (Thornton) provides a system using a motion detector and a temperature detecting element coupled to a NOR gate. The system uses the motion detector to determine if person is in an automobile, and the temperature detector to determine if an extreme temperature also exists. If both conditions exist, it sounds the automobile horn. A possible problem with this system is children may be sleeping and making little or no motion while still at risk. U.S. Pat. No. 5,949,340 (Rossi) describes a system with an automobile infant seat occupancy sensor of the switch, optical detector, heat detector, or weight detector type, that provides a reminder signal to fasten the safety harness on the seat. When the ignition of the automobile is turned off, the system provides an alarm to remind that the seat is still occupied. A more urgent warning may be provided if the child is not removed within a predetermined time period. Also described is an embodiment that incorporates a vehicle interior temperature sensor. This embodiment may perform various operations to alleviate harm coming of the seat occupant such as starting the vehicle air conditioning, opening the windows, or transmit a message to a remote location. U.S. Pat. No. 6,028,509 (Rice) describes a system that uses a temperature measuring circuit which provides an output signal when a particular high temperature is sensed, and a sound sensor which is adjusted to detect the high pitched sounds emitted by a child. The signals for these sensing devices are received by an AND gate and when both the high temperature is detected and the sounds of a child the system provides an alarm. A possible problem with this system is children may be sleeping and making little or no sound while still at risk. U.S. Pat. No. 6,819,249 (Papp) describes a system employing a plurality of pressure sensors incorporated into the seats of a vehicle. These sensors send a signal to the system processor to indicate the seat is occupied. The system alarms when the seats are occupied when the vehicle ignition is turned off, or, alternately the transmission placed in the park position. An embodiment of the system employs motion detectors. A NASA News Release describes a child car-seat safety device which senses when a child occupies a particular seat and a portable driver alarm is carried by the driver on a key ring. The alarm sounds when the child is in the seat and the portable driver alarm is a set distance from the sensor for a set period of time.

The systems described above present complexities in installation, operation, and in the cases of U.S. Pat. Nos. 5,949,340 (Rossi) and 6,819,249 (Papp), a high frequency of apparently unnecessary alarms. The NASA developed system also has high potential for unwanted alarms and does not address a situation where both parents may use the system. These are all undesirable features that tend to discourage use of these systems. The systems complexity makes their valuable child protection potential expensive, tending to discourage their use. There exists a need for an alarm system to protect children that is inexpensive, simple to use and install, and which alarms only when a serious threat appears.

SUMMARY OF THE INVENTION

This invention is a vehicle warning system with a temperature detector sensing vehicle interior temperature. The detector has an alarm setpoint. The system also has a childseat occupancy status detector switch that determines occupancy status of a child car seat or seats in the vehicle. If the temperature detector senses a temperature above the alarm setpoint and the childseat occupancy status detector switch senses the child car seat is occupied, an alarm signal device provides an alarm signal to warn that a child in an unsafe situation. The system may be turned off to prevent annoyance alarms, but turning the system off activates a warning signal.

OBJECTS AND ADVANTAGES

An object of this invention is to provide a uncomplicated system to protect children from an unsafe condition.

BRIEF DESCRIPTION OF THE SEVERAL VIEWS OF THE DRAWINGS

A more complete understanding of the present invention can be obtained by considering the detailed description in conjunction with the accompanying drawings, in which.

REFERENCE NUMERALS IN DRAWINGS

Figure 1:
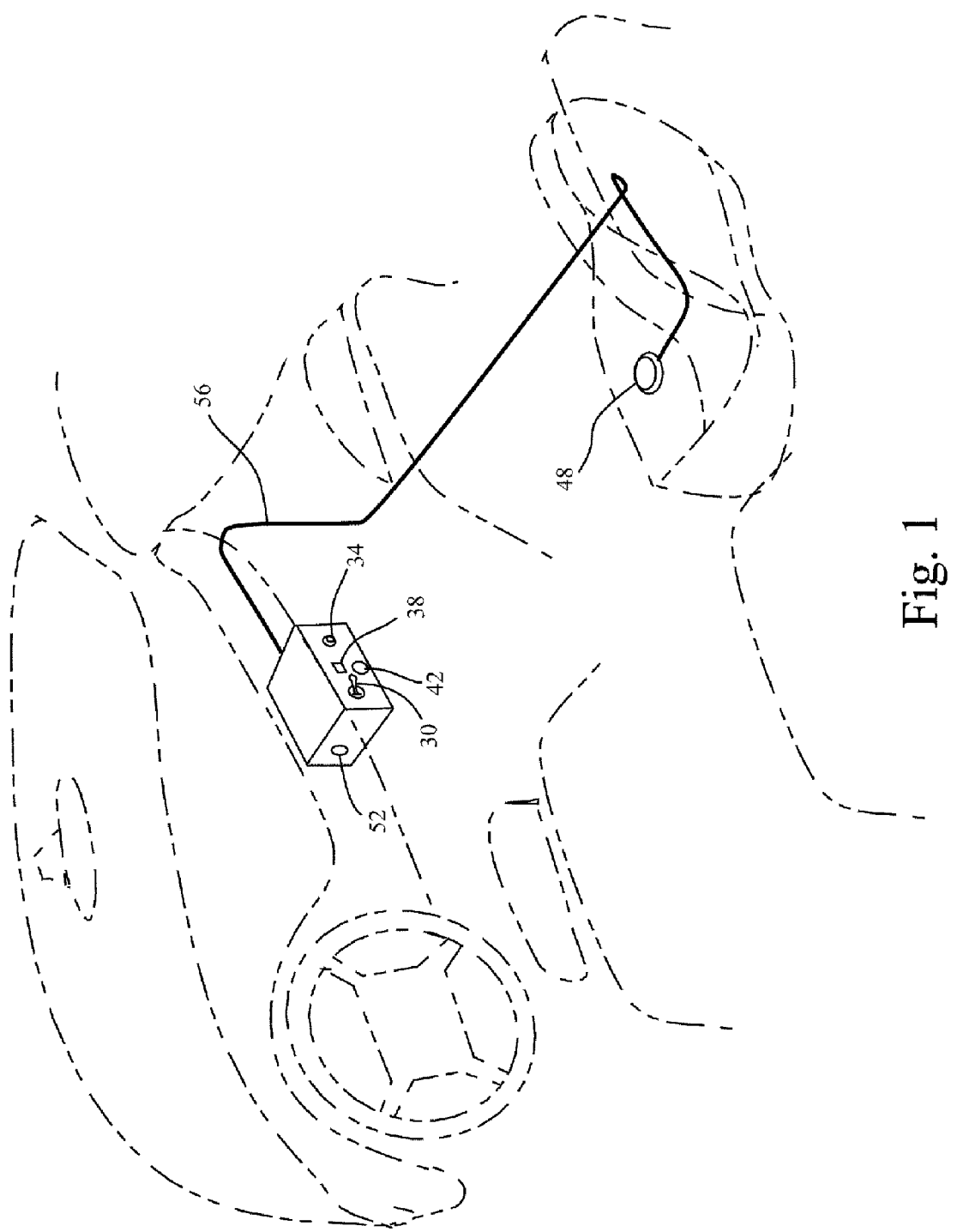
FIG. 1 is a layout and wiring diagram showing a typical installation of the vehicle childseat thermal safety alarm system.

These reference numbers are used in the drawings to refer to areas or features of the invention.

30 Control Switch
34 System-Off Warning Device
38 Temperature Detector
42 Alarm Signal Device
48 Childseat Occupancy Status Detector Switch
52 Power Supply
56 Connection Wiring

DETAILED DESCRIPTION OF THE INVENTION

The vehicle childseat thermal safety alarm system is shown installed in a vehicle in FIG. 1. The system sensors are a childseat occupancy status detector switch (48) that is the means for detecting a child in a vehicle seat, and is placed on the childseat when installed in the vehicle, and a temperature detector (38) that is the means for determining if a temperature setpoint has been exceeded. The childseat occupancy status detector is a switch that closes when the weight of a child bears upon it, and opens when the weight of the child is removed. Its physical configuration may be in the form of a soft rubber or plastic pad as shown, a small pillow, or other configuration that does not cause discomfort when sat upon. There, of course, may be multiple childseat occupancy status detectors associated with the system in a single vehicle. The temperature detector (38) may be incorporated into a housing containing the other system components, or the detector may be installed in the vehicle remote from the housing so as to sense temperature near the childseat. The nominal setpoint of the temperature detector is 100 degrees F. (about 38 degrees C.).

An alarm signal device (42) is the means for sounding an alarm if a child is in a vehicle seat and the temperature setpoint is exceeded. It sounds when the childseat occupancy status detector (48) and the temperature detector (38) indicate the childseat is occupied and the temperature in the vehicle exceeds 100 degrees F. The alarm signal device may be an independent noise-making device as shown in FIG. 1, or it may use the existing vehicle's alarm system in which it is installed. The independent noise-making device must provide sufficient alarm noise volume to alert people in the vicinity of the vehicle that an unsafe condition exists.

Figure 2:
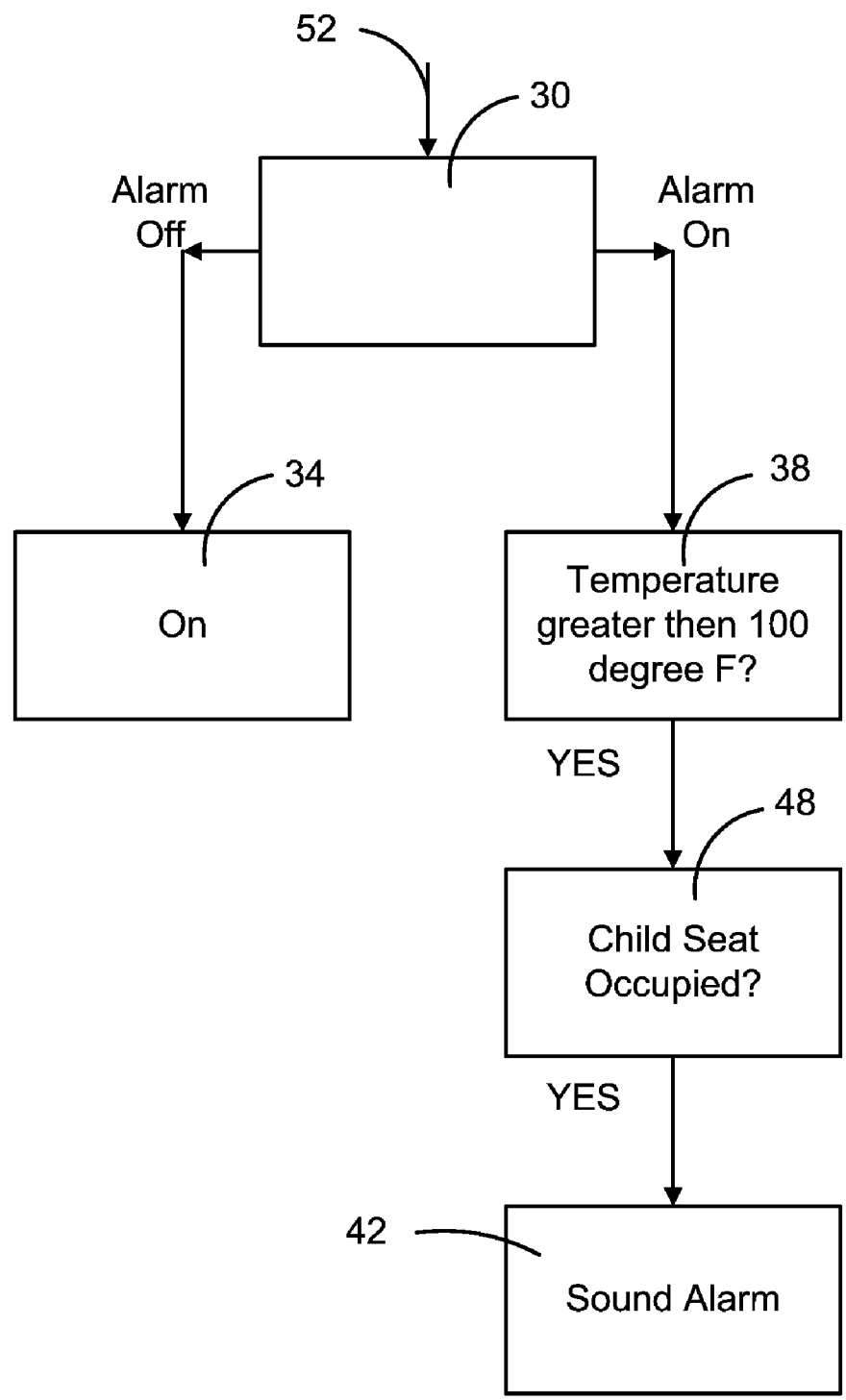
FIG. 2 is a schematic block diagram of the vehicle childseat thermal safety alarm system components.

The system has a control switch (30) and system-off warning device (34). The operation of this is shown in FIG. 2. The control switch has two positions, on and off. With the switch in the off position, the system-off warning device (34) is activated as shown in FIG. 2. This to alert the driver that the system is off. The system-off warning device used is generally an indicator light, but other alerting devices, such as a flasher controlled light, or a sonic alarm at low volume may be used. With the switch in the on position, the temperature detector (38) and the childseat occupancy status detector switch (48) are armed to provide an alarm signal to the alarm signal device (42) if the temperature is greater than 100 degrees F. and the childseat is occupied.

Figure 3:
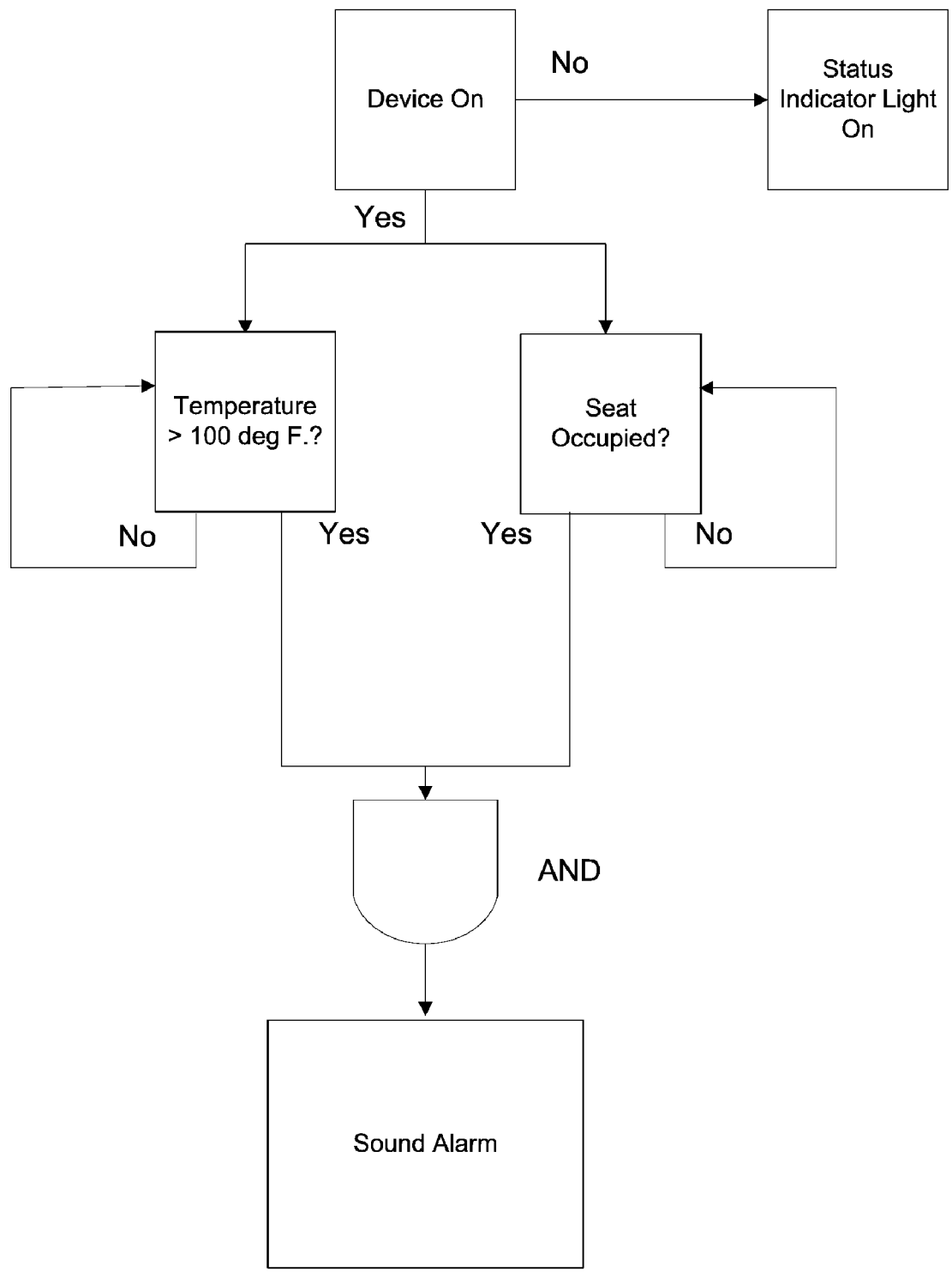
FIG. 3 is a diagram showing the vehicle childseat thermal safety alarm system logic.

FIG. 3 shows the logic of the vehicle childseat thermal safety alarm system electrical circuit. With the device off, the system-off warning device is on. With the device on, the temperature is sampled and the occupancy of the childseat is determined. If the temperature exceeds 100 degrees F. and the childseat is occupied, the alarm sounds.

Alternate Embodiments

An embodiment of the vehicle childseat thermal safety alarm system is to provide the system as described as an alarm input signal component to a vehicle alarm system. This embodiment would provide for the safety of the children sitting in childseats in the vehicle while other components of vehicle alarm system provide alarm signals indicating break-in to the vehicle, attempted theft, or manual alarm to request aid.

A second embodiment is to provide battery powered wireless detectors in the system, which provide a radio signal of the status detected by the sensor. The status signals are as shown in FIG. 2. on the temperature detector (38) and childseat occupancy status detector switch (48). The wireless detector signals are received in the control switch and input to a logic circuit as shown in FIG. 3.

Those familiar with the art recognize there are many possible applications and variations for the invention other than the embodiments recited. This recitation of the preferred and other embodiments is not intended to define or constrain the invention; rather the claims define the invention.

OPERATION

Installation of the vehicle childseat thermal safety alarm system is quick and simple. The control switch (30) is connected to the power supply (52). This may be a wired connection to the vehicle battery, or it may use a plug that fits the power outlet/cigarette lighter socket commonly on the vehicle dash. The childseat occupancy status detector (48) is placed on the childseat, or seats if there is more than one, and the connection wiring (56), if any, is connected to the control switch (30). If the control switch housing contains the temperature detector (38) the system is ready to operate and only needs to have the control switch turned on to be in service.

If the temperature detector is separate from the control switch housing, it needs to be located in the vehicle interior, preferable in a position where it will monitor the temperature near the childseat(s), and have its connection wiring, if any, connected to the control switch (30). The system is then in service.

We claim:

1. A vehicle childseat thermal safety alarm system arranged for quick and simple installation in the vehicle comprising:
   a. one or more childseat occupancy status detectors arranged to be placed on one or more childseats to detect the weight of a child bearing on the childseat;
   b. a temperature detector arranged to determine if a temperature setpoint has been exceeded;
   c. an alarm signal device arranged to make an alarm noise when the childseat is occupied and the temperature setpoint is exceeded;
   d. the installation includes a control switch connected to a vehicle power supply;
   e. a control switch housing contains the temperature detector; and
   f. the vehicle childseat thermal safety alarm system is ready to operate and only needs to have the control switch turned on to be in service.

2. The vehicle childseat thermal safety alarm system of claim 1 further comprising a control switch arranged with a childseat thermal safety alarm system on position and an off position, and a system off warning device arranged to provide a warning if the control switch is in the off position.

3. The vehicle childseat thermal safety alarm system of claim 1 further comprising the childseat occupancy status detector is a switch arranged to close when the child's weight bears on the switch.

4. The vehicle childseat thermal safety alarm system of claim 1 further comprising the temperature detector setpoint is 100 degrees fahrenheit.

5. The vehicle childseat thermal safety alarm system of claim 2 further comprising the childseat occupancy status detector is a switch arranged to close when the child's weight bears on the switch.

6. The vehicle childseat thermal safety alarm system of claim 2 further comprising the temperature detector setpoint is 100 degrees fahrenheit.

7. A vehicle warning system arranged for quick and simple installation in the vehicle comprising:
   a. means for detecting a child in a vehicle seat;
   b. means for determining if a temperature setpoint has been exceeded;
   c. means for sounding an alarm if a child is in a vehicle seat and the temperature setpoint is exceeded;
   d. means for connecting a control switch to a vehicle power supply;
   e. means for providing in a control switch housing the means for determining if a temperature setpoint has been exceeded; and
   f. the vehicle childseat thermal safety alarm system is ready to operate and only needs to having the control switch turned on to be in service.

8. A method of manufacturing a childseat thermal safety system for quick and simple installation in a vehicle comprising:
   a. connecting a childseat occupancy status detector to a logic circuit;
   b. connecting a temperature detector to a logic circuit;
   c. connecting an alarm signal device to a logic circuit;
   d. arranging the logic circuit to sound the alarm signal device when the childseat occupancy status detector is placed on a childseat and indicates a child occupies a seat due to the weight of a child bearing upon it, and the temperature exceeds a temperature setpoint;
   e. installing a control switch connected to a vehicle power supply;
   f. arranging a control switch housing to contain the temperature detector; and
   g. the vehicle childseat thermal safety alarm system is ready to operate and only needs to have the control switch turned on to be in service.

9. The system of claim 7 further comprising means for alerting the driver that the system is off.

10. The method of claim 8 further comprising:
    a. connecting a control switch arranged with a childseat thermal safety alarm system on position and an off position; and
    b. connecting a system off warning device arranged to provide a warning if the control switch is in the off position.

11. The vehicle childseat thermal safety alarm system of claim 1 further comprising the temperature detector is separable from the control switch housing.

12. The vehicle childseat thermal safety alarm system of claim 2 further comprising the temperature detector is separable from the control switch housing.

13. The vehicle warning system arranged for quick and simple installation in the vehicle of claim 7 further comprising the temperature detector is separable from the control switch housing.

14. The method of manufacturing a childseat thermal safety system for quick and simple installation in a vehicle of claim 8 further comprising arranging the temperature detector separable from the control switch housing.

\* \* \* \* \*